United States Patent
Katou

(10) Patent No.: US 9,273,657 B2
(45) Date of Patent: Mar. 1, 2016

(54) FUEL INJECTION CONTROL DEVICE FOR INTERNAL COMBUSTION ENGINE

(75) Inventor: Yuuichi Katou, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 113 days.

(21) Appl. No.: 13/878,529

(22) PCT Filed: Mar. 23, 2011

(86) PCT No.: PCT/JP2011/056996
§ 371 (c)(1),
(2), (4) Date: Apr. 9, 2013

(87) PCT Pub. No.: WO2012/127654
PCT Pub. Date: Sep. 27, 2012

(65) Prior Publication Data
US 2014/0000558 A1 Jan. 2, 2014

(51) Int. Cl.
F02M 69/04 (2006.01)
F02D 41/40 (2006.01)
F02D 41/38 (2006.01)

(52) U.S. Cl.
CPC ............ *F02M 69/04* (2013.01); *F02D 41/402* (2013.01); *F02D 2041/389* (2013.01); *F02D 2200/021* (2013.01); *F02D 2200/0414* (2013.01); *Y02T 10/44* (2013.01)

(58) Field of Classification Search
CPC .. F02M 69/04; F02D 41/02; F02D 2041/389; F02D 2200/021; F02D 2200/0414; Y02T 10/44
USPC ................................................ 123/445, 299
See application file for complete search history.

(56) References Cited

U.S. PATENT DOCUMENTS

| | | | |
|---|---|---|---|
| 6,044,642 A | 4/2000 | Nishimura et al. | |
| 6,718,946 B2 * | 4/2004 | Hokazono et al. | 123/445 |
| 6,823,849 B2 * | 11/2004 | Ichinose et al. | 123/491 |
| 7,159,568 B1 * | 1/2007 | Lewis et al. | 123/431 |
| 7,234,440 B2 * | 6/2007 | Hilditch | 123/305 |
| 2005/0086930 A1 | 4/2005 | Akagi et al. | |
| 2007/0261672 A1 * | 11/2007 | Lippert et al. | 123/445 |
| 2008/0041334 A1 * | 2/2008 | Brehob | 123/299 |
| 2008/0196693 A1 * | 8/2008 | Gwidt et al. | 123/445 |

(Continued)

FOREIGN PATENT DOCUMENTS

| | | |
|---|---|---|
| CN | 1189577 A | 8/1998 |
| CN | 101230805 A | 7/2008 |

(Continued)

*Primary Examiner* — Stephen K Cronin
*Assistant Examiner* — Susan E Scharpf
(74) *Attorney, Agent, or Firm* — Sughrue Mion, PLLC

(57) ABSTRACT

A fuel injection control device sets an injection sharing ratio of a quantity of a fuel injected in an intake stroke, and a quantity of a fuel injected in a compression stroke, based on an operating state or an environmental condition of the engine, and manipulates the cylinder fuel injection device so as to inject a part or all of a required fuel in the intake stroke and inject a remaining part in the compression stroke, in accordance with the set injection sharing ratio. The injection sharing ratio is set so as to make a proportion of the quantity of the fuel which is injected in the intake stroke larger when a temperature of air which is taken into a cylinder is higher than a fuel which is injected from the cylinder fuel injection device, as compared to when the temperature of the air is lower than the fuel.

5 Claims, 2 Drawing Sheets

(56) References Cited

U.S. PATENT DOCUMENTS

| | | | |
|---|---|---|---|
| 2008/0196694 A1* | 8/2008 | Ramappan et al. | 123/445 |
| 2010/0077990 A1* | 4/2010 | Shishime et al. | 123/299 |
| 2010/0183993 A1* | 7/2010 | McAlister | 431/254 |

FOREIGN PATENT DOCUMENTS

| | | |
|---|---|---|
| JP | 2005-61332 A | 3/2005 |
| JP | 2005-133579 A | 5/2005 |

\* cited by examiner

FUEL INJECTION CONTROL DEVICE FOR INTERNAL COMBUSTION ENGINE

CROSS REFERENCE TO RELATED APPLICATIONS

This application is a National Stage of International Application No. PCT/JP2011/056996, filed on Mar. 23, 2011, the contents of all of which are incorporated herein by reference in their entirety.

TECHNICAL FIELD

The present invention relates to a fuel injection control device for an internal combustion engine, and more particularly relates to a fuel injection control device for an internal combustion engine having a cylinder fuel injection device.

BACKGROUND ART

In the case of an internal combustion engine which has a cylinder fuel injection device, as a mode of fuel injection, two injection modes can be adopted, which are intake stroke injection to inject a fuel in an intake stroke, and compression stroke injection to inject a fuel in a compression stroke. However, each of the injection modes has its own merit and demerit. In the case of the intake stroke injection, such a merit is obtained that the temperature of the air which is taken into the cylinder is lowered by latent heat of vaporization at the time of the fuel being vaporized, and thereby, the charging efficiency of air can be enhanced. However, there is also the demerit that at a low-temperature time when the fuel is difficult to vaporize, the fuel which is injected into the cylinder in the intake stroke adheres to the cylinder wall, and is unburned and becomes HC and smoke to be discharged from the inside of the cylinder. Meanwhile, in the case of compression stroke injection, the fuel is injected into the atmosphere which reaches a high temperature due to compression, the fuel which adheres to the cylinder wall without being vaporized can be reduced, though the effect of enhancing the charging efficiency by the latent heat of vaporization cannot be obtained.

Japanese Patent Laid-Open No. 2005-061332 describes a specific example concerning the proper use of the respective injection modes having the merits and demerits as described above. According to the technique described in Japanese Patent Laid-Open No. 2005-061332, the compression stroke injection is selected for some time from the start of actuation, and after an integrated value of a fuel injection quantity or an integrated value of the number of times of fuel injection in the compression stroke injection reaches a threshold value, the injection mode is switched from the compression stroke injection to intake stroke injection. The aforementioned threshold value is an integrated value of a fuel injection quantity or an integrated value of the number of times of fuel injection which corresponds to a cylinder wall surface temperature when the cylinder is sufficiently warmed, and is set based on at least one of a cooling water temperature at the point of time of start of actuation, pressure of the fuel which is supplied to the fuel injection valve, and an engine stopping time.

CITATION LIST

Patent Literatures
Patent Literature 1: Japanese Patent Laid-Open No. 2005-061332

SUMMARY OF INVENTION

According to the technique described in the above described Japanese Patent Laid-Open No. 2005-061332, both the characteristics of the respective injection modes can be efficiently exploited. However, from the viewpoint of enhancing the output power of the engine, the intake stroke injection from which enhancement of the charging efficiency can be expected is desired to be made usable in a wider operation range.

The present invention is made in view of such a problem, and an object of the present invention is to obtain a merit by intake stroke injection in a wider operation range while efficiently exploiting a merit of compression stroke injection in an internal combustion engine having a cylinder fuel injection device.

According to one mode of a fuel injection control device which is provided by the present invention, an injection sharing ratio of a quantity of a fuel which is injected in an intake stroke, and a quantity of a fuel which is injected in a compression stroke is set in accordance with an operating state or an environmental condition of an internal combustion engine by an injection sharing ratio setting unit included by the fuel injection control device. By a manipulating unit which is included by the fuel injection control device, manipulation of the cylinder fuel injection device is performed so that a part or all of a fuel which is required is injected in the intake stroke, and a remaining part is injected in the compression stroke, in accordance with the set injection sharing ratio. In the step of setting the injection sharing ratio by the injection sharing ratio setting unit, it is determined whether a temperature of air which is taken into a cylinder is higher or lower than a temperature of a fuel which is injected from a cylinder fuel injection device.

When the temperature of the air which is taken into the cylinder is determined to be higher as a result of the above described determination, the injection sharing ratio setting unit sets the injection sharing ratio so as to make a proportion of the quantity of the fuel which is injected in the intake stroke larger as compared with a case where the temperature of the air which is taken into the cylinder is determined to be lower. The injection sharing ratio is preferably set as follows. First, when it is determined that the temperature of the air which is taken into the cylinder is lower than the temperature of the fuel which is injected from the cylinder fuel injection device, setting of the injection sharing ratio is such that the proportion of the quantity of the fuel which is injected in the compression stroke is made larger than the proportion of the quantity of the fuel which is injected in the intake stroke. When the temperature of the air which is taken into the cylinder is determined to be higher than the temperature of the fuel which is injected from the cylinder fuel injection device, setting of the injection sharing ratio is such that all of the required fuel is injected in the intake stroke.

When the temperature of the air which is taken into the cylinder is higher than the temperature of the fuel which is injected from the cylinder fuel injection device, the fuel is easily atomized by contact with the air at a high temperature. Further, in such a situation, the quantity of the fuel which adheres to the cylinder wall surface is small, and the adhering fuel is also easily vaporized. Accordingly, even if the proportion of the quantity of the fuel which is injected in the intake stroke is made large, the discharge quantity of HC and smoke hardly increases due to this. Meanwhile, by making the proportion of the quantity of the fuel which is injected in the intake stroke large, the intake air is cooled by the latent heat of vaporization at the time of the fuel being vaporized, and thereby, the effect of enhancing the charging efficiency is enhanced more. In contrast with this, when the temperature of the air which is taken into the cylinder is lower, the injection sharing ratio is set so as to make the proportion of the quantity of the fuel which is injected in the compression stroke larger as compared with the case where the temperature of the air is higher, and therefore, the fuel which adheres to the cylinder wall without being vaporized can be reduced. As is known from the above, according to one mode of the fuel injection control device which is provided by the present invention, the merit by the intake stroke injection can be obtained in a wider operation range while the merit of the compression stroke injection is efficiently exploited.

DESCRIPTION OF EMBODIMENTS

An embodiment of the present invention will be described with reference to the drawings.

Figure 1:
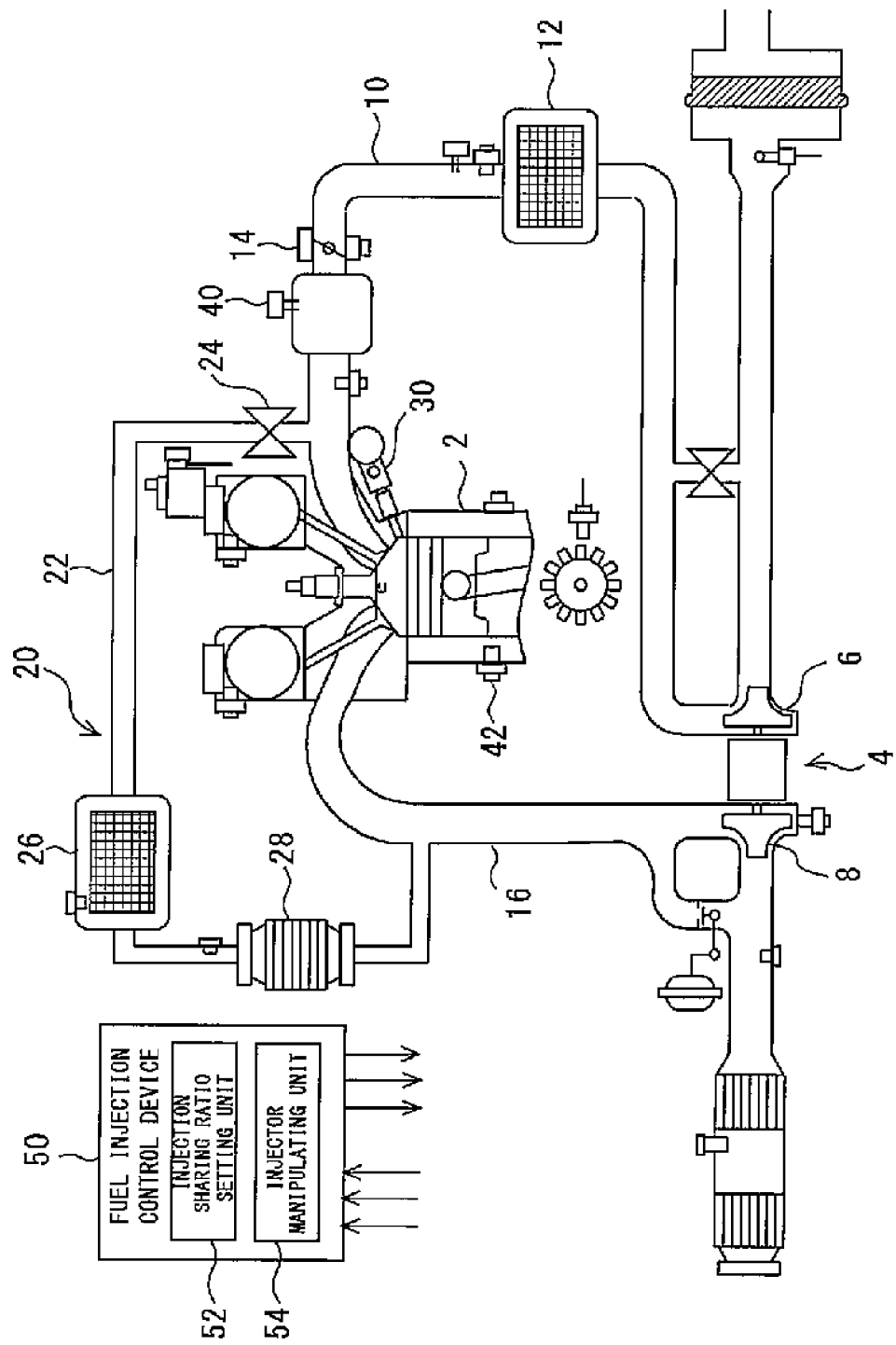
FIG. 1 is a system diagram of an internal combustion engine to which a fuel injection control device of an embodiment of the present invention is applied.

FIG. 1 is a diagram showing a system configuration of an internal combustion engine to which a fuel injection control device of the embodiment of the present invention is applied. The internal combustion engine according to the present embodiment is a spark ignition type four stroke reciprocal engine (hereinafter, simply called an engine) which uses gasoline as a fuel. The engine according to the present embodiment includes a turbo supercharger 4 which compresses air (fresh air) by using energy of exhaust gas. A compressor 6 of the turbo supercharger 4 is disposed in an intake passage 10, and a turbine 8 is disposed in an exhaust passage 16. An inter cooler 12 is attached downstream of the compressor 6 in the intake passage 10, and a throttle 14 is disposed further downstream thereof. Further, the supercharged engine according to the present embodiment is loaded with an EGR device 20 which recirculates exhaust gas from the exhaust passage 16 to the intake passage 10. The EGR device 20 is constituted of an EGR passage 22 which connects a region upstream from the turbine 8 of the exhaust passage 16 to a region downstream from the throttle 14 of the intake passage 10, an EGR valve 24 which is provided in the EGR passage 22, an EGR cooler 26 and an EGR catalyst 28.

The engine according to the present embodiment is also a direct injection engine which includes a cylinder fuel injection device which can directly inject a fuel into a cylinder. The cylinder fuel injection device is constituted of a direct injection injector 30 which is attached to an engine main body 2, and a fuel supply system including a high-pressure pump which is not illustrated. In the direct injection engine which has a cylinder fuel injection device like this, intake stroke injection to inject a fuel in an intake stroke, and compression stroke injection to inject a fuel in a compression stroke can be adopted as the injection mode of the fuel.

Further, the engine of the present embodiment includes an ECU 50. The ECU 50 is a control device which comprehensively controls an entire system of the engine. An actuator such as the aforementioned direct injection injector 30 is connected to an output side of the ECU 50, and various sensors which are attached to the engine main body 2 and a periphery thereof are connected to an input side of the ECU 50. As an example of such a sensor, an intake air temperature sensor 40 which is attached to a surge tank of the intake passage 10, and a water temperature sensor 42 which is attached to the engine main body 2 can be cited. The ECU 50 receives a signal from each of the sensors, and manipulates each of the actuators in accordance with a predetermined control program. A number of the other actuators and sensors which are connected to the ECU 50 are present as shown in the drawing, but in the present description, explanation thereof will be omitted.

The fuel injection control device of the present embodiment is realized as one function of the ECU 50. When the ECU 50 functions as the fuel injection control device, the ECU 50 is expressed by the combination of two signal processing units, that is, an injection sharing ratio setting unit 52 and an injector manipulating unit 54. These signal processing units may be each configured by exclusive hardware, or may share hardware and may be virtually configured by software.

The injection sharing ratio setting unit 52 is a signal processing unit which sets a ratio of a proportion of fuel injection by intake stroke injection and a proportion of fuel injection by compression stroke injection, that is, an injection sharing ratio of the fuel. When the proportion of the intake stroke injection by the set injection sharing ratio is 0%, all the fuel is injected by the compression stroke injection. Further, when the proportion of the intake stroke injection is 100%, all the fuel is injected by the intake stroke injection. In cases other than the above, the fuel is injected by being divided into the compression stroke injection and the intake stroke injection.

The injector manipulating unit 54 is a signal processing unit which manipulates the direct injection injector 30 in accordance with the set injection sharing ratio. The injector manipulating unit 54 sets the fuel quantity obtained by multiplying a required fuel quantity by the proportion of the intake stroke injection as a fuel quantity, and causes the direct injection injector 30 to inject the fuel in that quantity in the intake stroke. Subsequently, the injector manipulating unit 54 causes the direct injection injector 30 to inject the fuel in the remaining quantity in the compression stroke.

Figure 2:
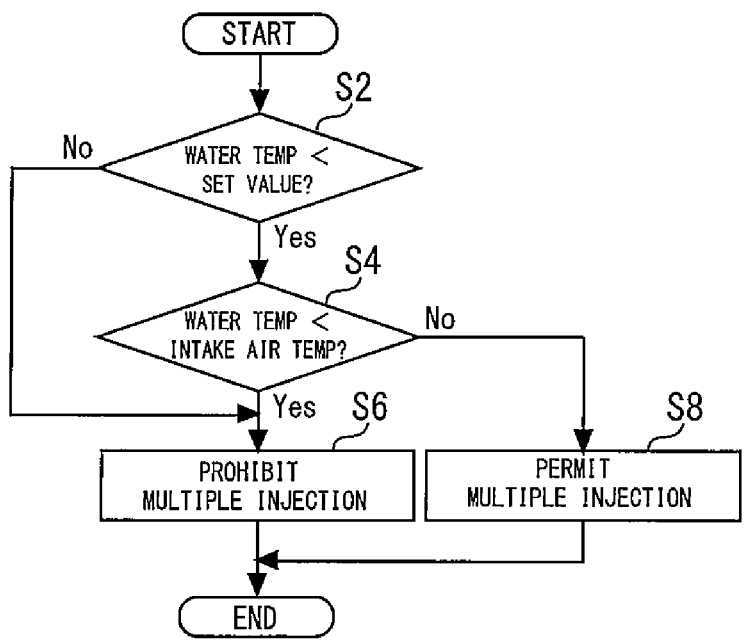
FIG. 2 is a flowchart showing a procedure of setting of an injection sharing ratio in the embodiment of the present invention.

The injection sharing ratio setting unit 52 sets an injection sharing ratio of the fuel in accordance with an operating state and an environmental condition of the engine. Information concerning the operating state and the environmental condition of the engine is acquired by various sensors included by the engine. However, the information which is used here is of an intake air temperature and a water temperature, and the intake air temperature and the water temperature can be respectively measured by the intake air temperature sensor 40 and the water temperature sensor 42. FIG. 2 shows a routine for setting the injection sharing ratio which is performed by using the information thereof in a flowchart. The injection sharing ratio setting unit 52 sets the injection sharing ratio of the fuel in accordance with the routine shown in FIG. 2 at least at the time of start of the engine.

According to the flowchart of FIG. 2, comparison of the water temperature and a predetermined set value is performed in the first step S2. The set value is a value to be a reference for determining whether the state of the engine is a low temperature state in which the merit of the compression stroke injection can be expected, in other words, whether the state of the engine is a low temperature state in which with only the intake stroke injection, the demerit thereof becomes remarkable. If the water temperature is at the set value or higher, the engine can be considered to be already sufficiently warmed, and therefore, the compression stroke injection does not have to be carried out. Accordingly, in this case, processing of step S6 is selected. In step S6, a plurality of times of injection of the fuel is prohibited, and only one time of fuel injection by the intake stroke injection is carried out.

Meanwhile, if the water temperature is lower than the set value, the engine can be considered not to be sufficiently warmed yet. When the engine is not sufficiently warmed, if the fuel is injected by the intake stroke injection, the fuel is likely to adhere to a cylinder wall surface without being sufficiently atomized. However, if the temperature of the air which is taken into the cylinder is high even though the engine is not warmed, the fuel is easily atomized by contact with the air at a high temperature. Further, it is conceivable that in such a situation, the quantity of the fuel which adheres to the cylinder wall surface is small, and the adhering fuel is easily vaporized.

Thus, in the next step S4, comparison of the water temperature and the intake air temperature is performed. The water temperature mentioned here means the temperature of the cooling water which flows in a water jacket of the engine main body 2, and a temperature thereof is substantially equal to the temperature of the fuel which is injected from the direct injection injector 30. This is because a delivery pipe which supplies the fuel to the direct injection injector 30 is assembled to a cylinder head, and therefore, the temperature of the fuel inside thereof is strongly influenced by the temperature of the engine main body 2. Accordingly, comparing the water temperature and the intake air temperature is equal to comparing the temperature of the fuel which is injected from the direct injection injector 30 and the temperature of the air which is taken into the cylinder.

Figure 3:
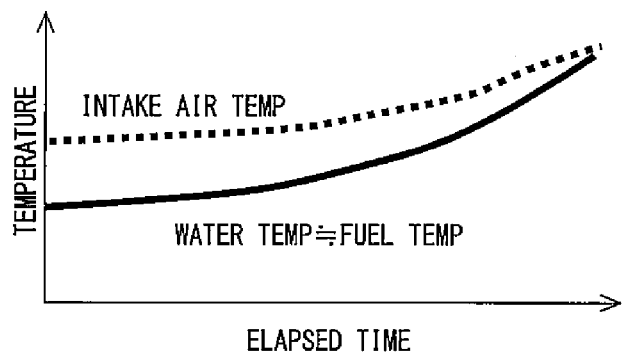
FIG. 3 is a diagram showing one mode of a relation of a water temperature and an intake air temperature.
Figure 4:
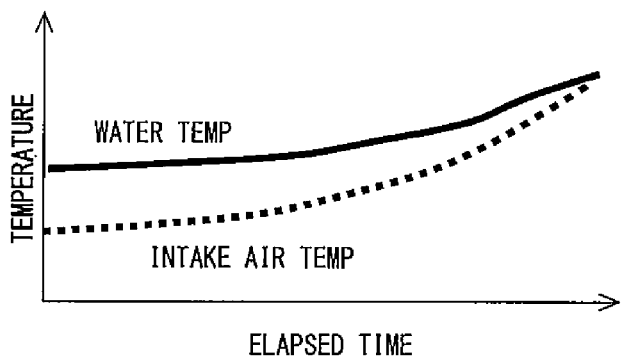
FIG. 4 is a diagram showing another mode of the relation of the water temperature and the intake air temperature.

The relation of the water temperature and the intake air temperature at the time of start of the engine includes a mode as shown in FIG. 3 and a mode as shown in FIG. 4. In general, there are more cases in which the intake air temperature is lower than the water temperature as shown in FIG. 4. However, depending on the condition, there can be some cases in which the intake air temperature is higher than the water temperature, as shown in FIG. 3. As one example of such a condition, the condition can be cited, in which clogging occurs to the inside of the inter cooler 12 due to adherence of deposit by oil, EGR gas and the like, and thereby, the cooling efficiency of air is reduced. Further, when the inter cooler 12 is a water cooling type, the intake air temperature can be higher than the water temperature when the cooling water does not circulate properly due to a failure of a circulation pump. Further, when high-temperature air in the engine chamber is taken in at the time of start after stoppage for a long time period, the intake air temperature also can be higher than the water temperature. Furthermore, the intake air temperature also can be higher than the water temperature at the time of going up a hill under a high load in the state of a low water temperature.

When the intake air temperature is lower than the water temperature as shown in FIG. 4, the intake air temperature is lower than the fuel temperature, and therefore, atomization of the fuel by contact of the air and the fuel does not advance. Meanwhile, when the intake air temperature is higher than the water temperature as shown in FIG. 3, the intake temperature is higher than the fuel temperature, and therefore, atomization of the fuel is promoted by contact of the air and the fuel. More specifically, the relation between the water temperature and the intake air temperature generates a large difference in the situation of atomization of the fuel in the cylinder. For such a reason, in the present embodiment, setting of the injection sharing ratio of the fuel is made to differ depending on which of the water temperature and the intake air temperature is higher as will be described next.

When the intake air temperature is lower than the water temperature, processing of step S8 is selected. In step S8, injection of the fuel by a plurality of times is permitted, and the fuel is injected by being divided into the intake stroke injection and the compression stroke injection. The injection sharing ratio at this time is set so that the proportion of the fuel quantity by the compression stroke injection becomes not less than the proportion of the fuel quantity by the intake stroke injection. This is for the purpose of reducing the quantity of the fuel by the intake stroke injection and suppressing the adherence of the fuel to the cylinder wall surface as much as possible.

When the intake air temperature is higher than the water temperature, processing of step S6 is selected. In step S6, injection of the fuel by a plurality of times is prohibited, and only one time of fuel injection by the intake stroke injection is carried out. More specifically, in this case, the injection sharing ratio is set so that the proportion of the fuel quantity by the intake stroke injection becomes 100%. In the situation in which the intake air temperature is higher than the water temperature, the fuel is easily atomized, the quantity of the fuel which adheres to the cylinder wall surface is small. Further, the adhering fuel is easily vaporized. Accordingly, even if all the fuel is injected in the intake stroke, an exhaust amount of HC and smoke due to this hardly increases. The compression stroke injection is stopped, and all the fuel is injected in the intake stroke, whereby the intake air is cooled by the latent heat of vaporization at the time of the fuel being vaporized, whereby the charging efficiency can be enhanced.

The above is the description of the embodiment of the present invention. However, the present invention is not limited to the aforementioned embodiment, and can be carried out by being variously modified within the range without departing from the gist of the present invention. For example, the present invention may be carried out by being modified as follows.

When the intake air temperature is higher than the water temperature in the above described embodiment, the compression stroke injection is not completely stopped, but the proportion of the compression stroke injection may be reduced as compared with the case in which the intake air temperature is lower than the water temperature. The proportion of the compression stroke injection is reduced, and the proportion of the intake stroke injection is increased correspondingly, whereby the charging efficiency of the air can be enhanced. Further, when the intake air temperature is lower than the water temperature, the fuel is not injected by being divided into the intake stroke injection and the compression stroke injection, but all the fuel may be injected by only the compression stroke injection.

In the above described embodiment, the temperature of the fuel is estimated according to the water temperature of the cooling water, but the temperature of the fuel may be estimated according to an oil temperature. Further, a temperature sensor may be attached to the delivery pipe, and the temperature of the fuel which is injected from the direct injection injector 30 may be directly measured.

The fuel injection control device of the present invention also can be applied to an engine which includes a mechanical supercharger. Further, the present invention can be applied to not only the supercharged engine, but also to a naturally aspirated type engine. However, the situation in which the intake air temperature becomes higher than the fuel temperature more easily occurs to the supercharged engine in which compression of air is performed by a compressor. Consequently, the effect provided by the present invention becomes more remarkable when the present invention is applied to a supercharged engine.

DESCRIPTION OF REFERENCE NUMERALS

2 Engine main body
4 Turbo supercharger
10 Intake passage
20 EGR device
30 Direct injection injector
40 Intake air temperature sensor
42 Water temperature sensor
50 ECU

The invention claimed is:

1. A fuel injection control device for an internal combustion engine having a cylinder fuel injection device, comprising:
   injection sharing ratio setting means that sets an injection sharing ratio of a quantity of a fuel which is injected in an intake stroke, and a quantity of a fuel which is injected in a compression stroke, in accordance with an operating state or an environmental condition of the internal combustion engine; and
   manipulating means that manipulates the cylinder fuel injection device to inject a part or all of a required fuel in the intake stroke and inject a remaining part in the compression stroke, in accordance with the set injection sharing ratio,
   wherein the injection sharing ratio setting means sets the injection sharing ratio so as to make a proportion of the quantity of the fuel which is injected in the intake stroke larger when a temperature of air which is taken into a cylinder is determined to be higher than a temperature of a fuel which is injected from the cylinder fuel injection device, as compared with a case where the temperature of the air which is taken into the cylinder is determined to be lower than the temperature of the fuel which is injected from the cylinder fuel injection device.

2. The fuel injection control device for an internal combustion engine according to claim 1,
   wherein the injection sharing ratio setting means sets the injection sharing ratio so as to make a proportion of a quantity of a fuel which is injected in the compression stroke larger than the proportion of the quantity of the fuel which is injected in the intake stroke when the temperature of the air which is taken into the cylinder is determined to be lower than the temperature of the fuel which is injected from the cylinder fuel intake device, and sets the injection sharing ratio so that all of a required fuel is injected in the intake stroke when the temperature of the air which is taken into the cylinder is determined to be higher than the temperature of the fuel which is injected from the cylinder fuel injection device.

3. The fuel injection control device for an internal combustion engine according to claim 1,
   wherein the internal combustion engine is an internal combustion engine with a supercharger.

4. A direct-injection internal combustion engine having a cylinder fuel injection device, comprising:
   a fuel injection control device that makes a proportion of a quantity of a fuel which is injected in an intake stroke larger when a temperature of air which is taken into a cylinder is higher than a temperature of a fuel which is injected from the cylinder fuel injection device, as compared with a case where the temperature of the air which is taken into the cylinder is lower than the temperature of the fuel which is injected from the cylinder fuel injection device.

5. The direct-injection internal combustion engine according to claim 4,
   wherein the fuel injection control device makes a proportion of a quantity of a fuel which is injected in the compression stroke larger than the proportion of the quantity of the fuel which is injected in the intake stroke when the temperature of the air which is taken into the cylinder is lower than the temperature of the fuel which is injected from the cylinder fuel intake device, and makes all of a required fuel injected in the intake stroke when the temperature of the air which is taken into the cylinder is higher than the temperature of the fuel which is injected from the cylinder fuel injection device.

* * * * *